United States Patent [19]

Büch et al.

[11] Patent Number: 5,112,970

[45] Date of Patent: May 12, 1992

[54] WATER-SOLUBLE TRIPHENDIOXAZINE COMPOUNDS AND PRECURSORS THEREOF CONTAINING SULFONYL GROUPS, PROCESSES FOR THEIR PREPARATION AND THE USE OF THE TRIPHENDIOXAZINES AS DYESTUFFS

[75] Inventors: Holger M. Büch, Hofheim am Taunus; Hartmut Springer, Königstein/Taunus, both of Fed. Rep. of Germany

[73] Assignee: Hoechst Aktieneesellschaft, Frankfurt am Main, Fed. Rep. of Germany

[21] Appl. No.: 397,526

[22] Filed: Aug. 23, 1989

[30] Foreign Application Priority Data

Aug. 25, 1988 [DE] Fed. Rep. of Germany ....... 3828824

[51] Int. Cl.⁵ .................. C09B 19/02; D06P 3/58; C07D 265/38
[52] U.S. Cl. ........................ 544/75; 544/76; 544/77
[58] Field of Search ............... 544/76, 77, 75

[56] References Cited

U.S. PATENT DOCUMENTS

| | | | |
|---|---|---|---|
| 4,512,773 | 4/1985 | Anderton et al. | 544/76 |
| 4,588,810 | 5/1986 | Harms et al. | 544/76 |
| 4,782,150 | 11/1988 | Springer et al. | 544/77 |
| 4,785,098 | 11/1988 | Fuchs et al. | 544/76 |
| 4,785,099 | 11/1988 | Springer et al. | 544/76 |

FOREIGN PATENT DOCUMENTS

| | | | |
|---|---|---|---|
| 0148390 | 7/1985 | European Pat. Off. | 544/76 |
| 0258686 | 3/1988 | European Pat. Off. | 544/76 |
| 0095255 | 11/1988 | European Pat. Off. | 544/76 |

*Primary Examiner*—Diana Rivers
*Assistant Examiner*—Matthew V. Grumbling

[57] ABSTRACT

Water-soluble triphendioxazine compounds of the formula (1) with quaternary ammonium groups

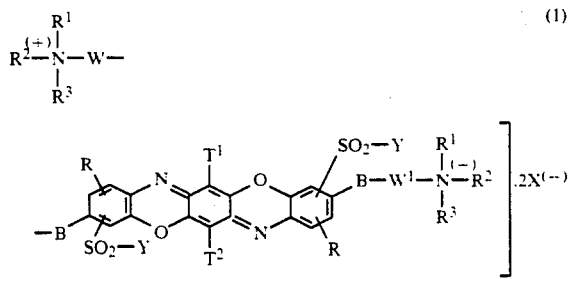

in which the substituents are defined in claim 1.

The compounds (1) have fiber-reactive dyestuff properties and dye, for example, cellulose fiber materials, wool and synthetic polyamide in deep, fast shades.

15 Claims, No Drawings

WATER-SOLUBLE TRIPHENDIOXAZINE COMPOUNDS AND PRECURSORS THEREOF CONTAINING SULFONYL GROUPS, PROCESSES FOR THEIR PREPARATION AND THE USE OF THE TRIPHENDIOXAZINES AS DYESTUFFS

The present invention relates to the field of fiber-reactive dyestuffs.

Triphendioxazine compounds which have the fiber-reactive group from the vinyl sulfone series as a substituent on the phene radicals of the triphendioxazine and are additionally substituted on these phene radicals by N'-(monoalkyl)- or N',N'-(dialkyl)-amino-alkylamino radicals which are optionally substituted in the alkyl groups, are known from some tabular examples in European Patent Application Publication No. 0,168,751A. However, these dye-stuffs have certain deficiencies in their technological properties, such as, in particular, a poor water-solubility under alkaline dyeing conditions and a lack of leveling capacity.

Novel triphendioxazine compounds having quaternary ammonium groups as radicals which confer water-solubility and corresponding to the general formula (1)

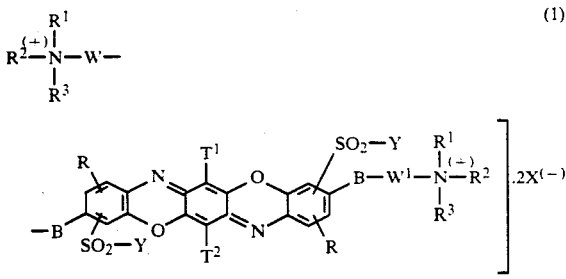

which have useful fiber-reactive dyestuff properties, have now been found.

In this formula (1):

B is an oxygen or sulfur atom or an amino group of the formula —NH— or —N(R')—, in which R' is an alkyl group having 1 to 4 carbon atoms, such as the methyl or ethyl group, which can be substituted, or has one of the meanings of the group $X^{(-)}[R^3, R^2, R^1]N^{(+)}$—W— or —W$^1$—$^{(+)}$N$[R^1, R^2, R^3]X^{(-)}$, where W, W$^1$, R$^1$, R$^2$, R$^3$ and X$^{(-)}$ have the definition given below, or, together with R$^1$, forms an alkylene radical having 2 to 4 carbon atoms;

R$^1$ is a straight-chain or branched alkyl group having 1 to 6 carbon atoms, preferably 1 to 4 carbon atoms, which can be substituted, preferably by 1 or 2 substituents, the substituents being, in particular, groups which confer water-solubility or are hydrophilic;

R$^2$ has one of the meanings of R$^1$ and

R$^3$ has one of the meanings of R$^1$, or

R$^2$ and R$^3$, together with the positively charged nitrogen atom and optionally a further heteroatom, such as an oxygen, nitrogen or sulfur atom, form a heterocyclic radical, such as the trimethyleneiminium, pyrrolidinium, morpholinium, piperidinium or piperazinium radical, it being possible for a benzo radical to be optionally fused onto the heterocyclic radical, such as, for example, the benzopyrrolidinium radical;

X$^{(-)}$ is the molar equivalent of a colorless anion, preferably of a strong acid (in the case where one of the substituents of R$^1$, R$^2$ and R$^3$ contains an acid group, this is capable of forming an inner salt with the ammonium nitrogen, so that in this case the X$^{(-)}$ has no meaning);

W is an alkylene radical having 2 to 6 carbon atoms, which can be substituted, or is an alkylene radical having 4 to 12 carbon atoms, which can be interrupted by one or more, such as, for example, 2 to 5, preferably 1 or 2, hetero groups, it being possible for the individual alkylene portions, preferably having 2 to 4 carbon atoms, to be further substituted;

W$^1$ has one of the meanings of W;

Y is the vinyl group or the ethyl group, which contains in the β-position a substituent which can be eliminated by an alkali, the group —SO$_2$—Y preferably being bonded to the benzene nucleus in the ortho-position relative to the radical B;

R is a hydrogen atom or a sulfo group;

T$^1$ is a hydrogen atom or a halogen atom, such as a fluorine and in particular a chlorine or bromine atom, a cycloalkyl group having 5 to 8 carbon atoms, such as the cyclohexyl group, an aralkyloxy group, an alkoxy group having 1 to 4 carbon atoms, such as the methoxy group, an aryloxy group, an alkyl group having 1 to 4 carbon atoms, such as the methyl group, an aryl group, an aralkyl group, a cyano group, a carboxy group, a carbalkoxy group having 2 to 5 carbon atoms, such as the carbomethoxy or carbethoxy group, an arylamino group, a carbamoyl group, an N-alkylcarbamoyl group or N,N-dialkyl-carbamoyl group with alkyl radicals having in each case 1 to 4 carbon atoms, an N-arylcarbamoyl group, an alkanoylamino group having 2 to 5 carbon atoms, such as the acetylamino group, or an aroylamino group, such as the benzoylamino group, the aryl radicals in these substituents mentioned preferably being phenyl radicals, which can be further substituted by 1 or 2 substituents from the group comprising halogen, such as chlorine, nitro, alkyl having 1 to 4 carbon atoms, alkoxy having 1 to 4 carbon atoms, carboxy and sulfo, and T$^1$ preferably being a hydrogen atom, an alkanoylamino group having 2 to 5 carbon atoms, a phenoxy group, which can be substituted, an alkoxy group having 1 to 4 carbon atoms or an alkyl group having 1 to 4 carbon atoms, or, particularly preferably, a chlorine atom or bromine atom;

T$^2$ has one of the meanings given for T$^1$; and the individual members of the formula, including those which appear twice, can have meanings which are identical to one another or different from one another.

The substituents "sulfo", "carboxy", "phosphato", "thiosulfato" and "sulfato" include both the acid form thereof and the salt form thereof. Accordingly, sulfo groups denote groups corresponding to the general formula —SO$_3$M, carboxy groups denote groups corresponding to the general formula —COOM, phosphato groups denote groups corresponding to the general formula —OPO$_3$M$_2$, thiosulfato groups denote groups corresponding to the general formula —S—SO$_3$M and sulfato groups denote groups corresponding to the general formula —OSO$_3$M, in which M denotes a hydrogen atom or an alkali metal, such as sodium, potassium or lithium.

The novel dioxazine compounds can be either in acid form or in the form of their salts. They are preferably in the form of the salts, in particular the alkali metal and alkaline earth metal salts, and are also preferably used in the form of these salts for dyeing (understood here and below in the general sense and including printing) materials containing hydroxy and/or carboxamide groups, in particular fiber materials.

Examples of substituents in the alkyl radical of R' are groups which confer water-solubility or are hydrophilic, such as, for example, the sulfo, sulfato, phosphato or carboxy group or a lower alkoxy group, such as the methoxy group; other groups are, for example, an alkanoylamino group having 2 to 5 carbon atoms, such as the acetylamino group, or a phenyl or sulfophenyl radical. Examples of alkyl radicals of R' are methyl, ethyl, 1-propyl, 2-propyl, 1-butyl, 2-butyl, 2-methyl-1-propyl, benzyl, 3-sulfo or 4-sulfo-benzyl, β-(sulfophenyl)-ethyl, β-sulfoethyl and β-sulfatoethyl. R' preferably denotes a methyl group.

Examples of possible substituents in the alkyl radicals $R^1$, $R^2$ and $R^3$ are 1, 2 or 3, preferably 1 or 2, substituents from the group comprising carboxy, sulfo, sulfato, phosphato, alkoxy having 1 to 4 carbon atoms, such as methoxy, alkanoyloxy having 2 to 5 carbon atoms, such as acetoxy, phenyl and phenyl which is substituted by 1 or 2 sulfo groups, and preferred substituents of these are those which have properties conferring water-solubility or hydrophilic properties. Examples of radicals $R^1$, $R^2$ or $R^3$ are methyl, ethyl, 1-propyl, 2-propyl, 1-butyl, 2-butyl, 2-methyl, 1-propyl, 1-pentyl, phenyl, benzyl, 3- or 4-sulfobenzyl, β-sulfato-ethyl, β-phosphato-ethyl, carboxymethyl, β-sulfo-ethyl, ω-sulfato-hexyl, δ-sulfato-propyl, γ-sulfato-propyl, β-carboxy-ethyl, β-acetoxy-ethyl, β-propionyloxy-ethyl, carbomethoxy-methyl and carboxy-methyl, and of these in particular methyl, ethyl, carboxymethyl and β-sulfatoethyl.

Examples of anions $X^{(-)}$ are the fluoride, chloride or bromide anion, the molar equivalent of the methosulfate or ethosulfate anion ($\frac{1}{2}$ $CH_3SO_4^{2(-)}$ or $\frac{1}{2}$ $C_2H_5SO_4^{2(-)}$) or the benzene sulfonate, the toluene sulfonate, the tetrafluoborate, the hexachloroantimonate and preferably the hydrogen sulfate anion, and in particular the molar equivalent of the sulfate anion ($\frac{1}{2}$ $SO_4^{2(-)}$).

Examples of possible substituents in the alkylene radical of W or $W^1$ are the sulfato, phosphato, carboxy, sulfo or phenyl group or a monosulfophenyl or disulfophenyl group. If the alkylene radicals of W or $W^1$ are substituted, these are preferably substituted by 1 or 2 substituents. Examples of hetero groups by which the alkylene groups of W or $W^1$ can be interrupted are those which are chosen from the groups —O—, —S—, —SO$_2$—, —CO—, 1,4-piperidino, —NH— and —N(R$^0$)—, in which $R^0$ is an alkyl group having 1 to 6 carbon atoms, preferably 1 to 4 carbon atoms, such as, in particular, the methyl or ethyl group, which can be substituted, or an alkanoyl group having 2 to 5 carbon atoms, such as the acetyl group. Examples of possible substituents in the alkyl group of $R^0$ are the sulfo, sulfato, carboxy, phosphato, phenyl, monosulfophenyl or disulfophenyl group.

Examples of radicals $W^1$ are the 1,2-ethylene, 1,3-propylene, 1,4-butylene, 1,6-hexylene and 2-sulfato-1,3-propylene radical, and furthermore a radical of the following formulae (a) to (u):

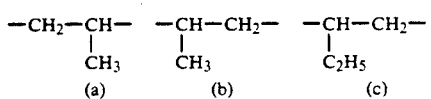

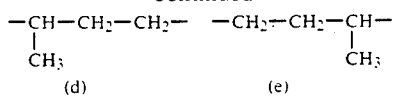

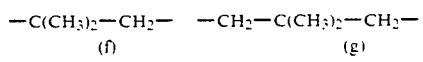

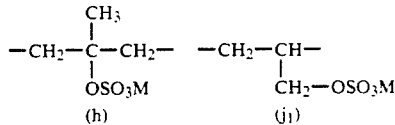

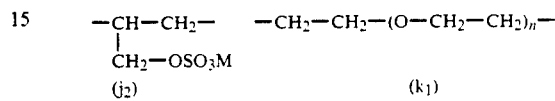

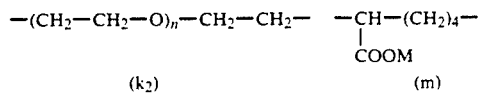

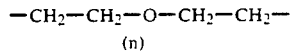

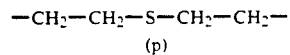

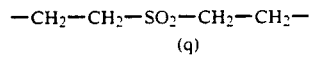

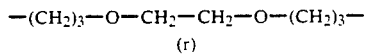

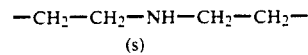

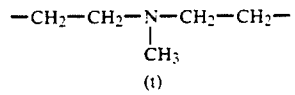

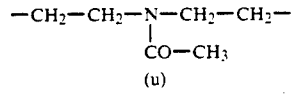

in which M has the abovementioned meaning and n represents an integer from 1 to 5.

Of these, preferred radicals are the 1,2-ethylene, 1,3-propylene and 2-sulfato-1,3-propylene radical and a radical of the formula (a), (b), (d), (j$_1$) and (k$_1$).

Examples of the radicals W are the groups just mentioned for $W^1$ which are positioned, however, as "mirror images".

Substituents which are bonded in the β-position of the ethyl group according to the formula member Y and can be eliminated by an alkali to form the vinyl group are, for example, alkanoyloxy groups having 2 to 5 carbon atoms, such as the acetoxy group, aroyloxy groups, such as the benzoyloxy, sulfobenzoyloxy or carboxybenzoyloxy group, dialkylamino groups with alkyl radicals having 1 to 4 carbon atoms, such as, in particular, the dimethylamino and diethylamino group, trialkylammonium groups with alkyl radicals having 1 to 4 carbon atoms, such as the trimethylammonium group, the chlorine atom, the bromine atom, alkylsulfonyloxy groups with alkyl radicals having 1 to 4 carbon atoms, a phosphato group, a thiosulfato group or a sulfato group. Preferred groups corresponding to the formula member Y are the β-chloroethyl, β-phosphatoethyl, β-acetoxyethyl and β-thiosulfatoethyl group, and in particular the vinyl group, and especially preferably the β-sulfatoethyl group.

Particularly preferred triphendioxazine compounds according to the invention are those in which the formula radical B in each case denotes the group —NH—, and furthermore those in which W and W¹ in each case denote the ethylene or n-propylene group, and moreover those corresponding to the general formula (1) in which R¹ and R² both represent the methyl or ethyl group and R³ is the ethyl group or the carboxymethyl, β-sulfatoethyl or β-sulfoethyl group or an n-propyl group which is substituted by a sulfato group. Preferred compounds are moreover those triphendioxazine compounds of the formula (1) in which T¹ and T² each denote a chlorine atom, and furthermore triphendioxazine compounds in which Y denotes the β-sulfatoethyl group.

The present invention furthermore relates to processes for the preparation of the compounds mentioned above and defined of the general formula (1). These comprise cyclizing a compound of the general formula (2)

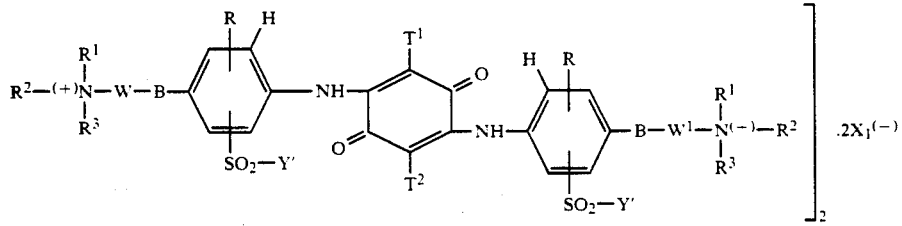

(in which Y' is the vinyl group, the β-hydroxyethyl group or an ethyl group which contains in the β-position a substituent which can be eliminated by an alkali, such as one of those mentioned for Y, preferably the β-hydroxyethyl group, $X_1^{(-)}$ denotes the molar equivalent of any desired anion, such as, for example, a colorless anion defined in accordance with the definition of $X^{(-)}$ or a hydroxyl or iodine ion, and R¹, R², R³, B, W, W¹, R, T¹ and T² have the abovementioned meanings, it also being possible for these to be, as substituted alkyl groups, hydroxy-substituted alkyl groups, and the groups —SO₂—Y' preferably being bonded in the ortho-position relative to the group B) to the triphendioxazine in a solvent which is inert under the reaction conditions and towards the reactants and if appropriate in the presence of an oxidizing agent, but preferably in an acid medium and preferably in the presence of an oxidizing agent. The reaction is carried out in a procedure which is known per se, thus, for example, in boiling nitrobenzene or o-dichlorobenzene, if appropriate in the presence of benzoyl chloride or toluenesulfonyl chloride, or in a boiling alkanol having 2 to 4 carbon atoms or in pyridine in the presence of aluminum trichloride, but preferably in sulfuric acid or sulfuric acid containing sulfur trioxide, as the reaction medium, suitable oxidizing agents being, inter alia, alkylhydroperoxides, alkali metal hypochlorites, alkali metal chlorates, potassium permanganate and chlorine, but in particular sulfur trioxide, hydrogen peroxide, ammonium or alkali metal persulfates, iodine or inorganic iodine compounds in the presence of oleum, sodium perborate, but preferably the peroxodisulfate of sodium, potassium or ammonium [corresponding to the formulae Na₂S₂O₈ or K₂S₂O₈ or (NH₄)₂S₂O₈] being used as the oxidizing agent. Analogous procedures are known, for example, from German Offenlegungsschriften Nos. 2,122,262, 2,124,080, 2,302,382, 2,344,781, 2,503,611 and 2,823,828, from British Patent No. 2,019,872, and furthermore from Helvet. Chim. Acta 22, 1348 (1939) and in particular from British Patent No. 1,589,915 and European Patent Application Publication Nos. 0,141,359A and 0,168,751A.

The cyclization is preferably carried out in concentrated sulfuric acid, such as 96 to preferably 100% strength sulfuric acid, and in particular in sulfuric acid containing sulfur trioxide (oleum), such as up to 50% strength by weight oleum. The reaction temperature is chosen between 0° and 60° C. The oleum used as the reaction medium and agent overall contains 5 to 40% by weight, preferably 10 to 20% by weight, of sulfur trioxide. If peroxodisulfate is added as the oxidizing agent, the cyclization is carried out between 0° and 40° C., preferably between 15° and 25° C. If oleum/peroxodisulfate is used, the reaction temperature should not exceed 30° C. 10 to 20% strength oleum using twice the molar amount of peroxodisulfate with respect to compound (2) is preferred. If iodine is the oxidizing agent, this is employed in catalytic amounts in 10 to 50% strength oleum; in this case, the reaction temperature is as a rule between 0° and 40° C.

At the same time as the cyclization or after the cyclization reaction, any hydroxyalkyl groups present, such as, for example, the β-hydroxyethyl group of the formula radical Y', are esterified into the corresponding β-sulfatoalkyl or β-phosphatoalkyl groups by means of a sulfating or phosphating agent, such as 96–100% strength sulfuric acid or sulfuric acid containing sulfur trioxide or polyphosphoric acid. Thus, if the cyclization is carried out in sulfuric acid or oleum as the reaction medium, hydroxy groups which are bonded to an alkyl radical of the molecule, such as, for example, the β-hydroxyethyl groups of the formula radical Y' already mentioned above or hydroxyalkyl groups of the formula radicals R¹, R², R³, R', R⁰, W and W', are converted into the corresponding sulfatoalkyl groups.

At cyclization temperatures above 15° C., in particular above 25° C., sulfo groups can also be introduced according to the invention into the aromatic rings of the aryl radicals of R¹, R², R³, R', R⁰, T¹ and T² by means of 100% strength sulfuric acid or oleum. However, the sulfation reaction can also be carried out after the cyclization, if appropriate in a separate reaction step on the isolated cyclization product (triphendioxazine). In this case, the sulfation reaction is as a rule carried out between 20° and 80° C., preferably between 30° and 70° C.

Compounds of the formula (1) where Y is a β-sulfatoethyl group can then be converted by known procedures into other compounds of the formula (1) according to the invention in which the radicals Y represent vinyl groups or ethyl groups having a different substituent in the β-position which can be eliminated by an alkali.

The starting compounds of the general formula (2) can be prepared according to the invention by reaction of a compound of the general formula (3)

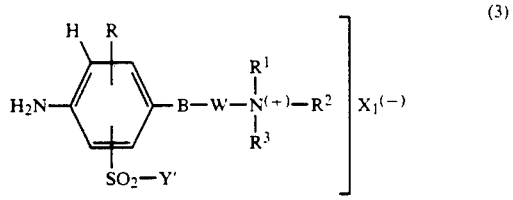

(in which W also represents W$^1$, Y' has the abovementioned meaning and is preferably the β-hydroxyethyl group and R$^1$, R$^2$, R$^3$, B, R and X$_1^{(-)}$ have the abovementioned meanings, it also being possible for these to be, as substituted alkyl groups, hydroxy-substituted alkyl groups and it also being possible for aryl radicals to be free from sulfo groups, the groups —SO$_2$—Y' preferably being bonded in the ortho-position relative to the group B) with a 1,4-benzoquinone compound of the general formula (4)

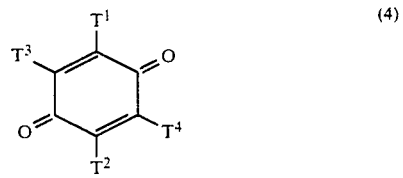

in which T$^1$ and T$^2$ have the abovementioned meanings and T$^3$ and T$^4$ are identical to one another or different from one another and each represents a hydrogen atom, an alkoxy group having 1 to 4 carbon atoms, such as, in particular, the methoxy group, or a phenoxy group, or is preferably a halogen atom, such as a fluorine atom, and in particular a bromine atom and in particular a chlorine atom, it also being possible for T$^3$ and T$^4$ to have a meaning identical to T$^1$ and T$^2$.

The reaction of a compound of the general formula (3) or of two different amino compounds of the general formula (3), in each case in total in twice the equivalent amount, with one equivalent of a compound of the general formula (4) to give the compound of the general formula (2) is carried out by procedures analogous to known procedures, which are mentioned and described, for example, in European Patent Application Publication Nos. 0,141,966A and 0,168,751A. For example, the reaction can be carried out in an aqueous medium or in an aqueous-organic medium or in a purely organic medium, the organic solvents being polar aprotic or protic solvents, such as, for example, lower alkanols, such as methanol and ethanol, and halogenated benzenes, such as o-dichlorobenzene. However, the quinone (4) is preferably employed in a larger or smaller excess, which as a rule is 5 to 20%. The reaction of the amines (3) with the quinones (4) can be carried out at a temperature between 20° and 100° C., preferably between 50° and 70° C., in the presence of an acid-binding agent, such as, for example, an alkali metal carbonate or acetate or alkaline earth metal carbonate or acetate, thus, for example, sodium acetate, sodium carbonate or sodium bicarbonate, or an alkali metal hydroxide or alkaline earth metal hydroxide, such as sodium hydroxide, or an oxide of an alkaline earth metal, such as, for example, magnesium oxide. If the reaction is carried out in an aqueous or aqueous-organic medium, a pH range between 4 and 7, preferably between 5.5 and 6.5, is established.

The aniline starting compounds of the general formula (3) have not yet been disclosed. The invention thus also relates to these compounds, processes for their preparation and their use for the synthesis of dyestuffs, in particular of triphendioxazine compounds of the above formula (1). They can be prepared by procedures analogous to known procedures of alkylation (quaternization) of amino compounds using customary and known alkylating agents, thus, for example, according to the invention by reaction of an amino-nitrobenzene compound of the general formula (5)

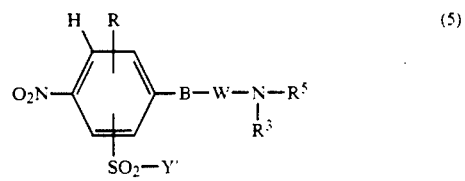

in which Y', B, W, R and R$^3$ have the abovementioned meanings and R$^5$ represents a hydrogen atom or has one of the meanings of R$^2$, with an alkylating agent and by subsequent reduction of the nitro group.

The synthesis which can be carried out by procedures which are known per se and customary for quaternization (see Houben-Weyl, Methoden der Organischen Chemie (Methods of Organic Chemistry), 4th edition, volume XI/2, pages 587–640 (1958)) is carried out, for example, according to the invention in an aqueous or aqueous-organic or organic medium, the organic solvent being one with a high dipole moment, such as, for example, an alkanol having 1 to 4 carbon atoms or acetonitrile, at a temperature between 10° C. and 120° C. Alkylating agents are the compounds known in the literature, such as, for example, those corresponding to the general formula R$^1$-X, where R$^1$ has the abovementioned meaning and X denotes an acyl radical, such as halogen, or a ½ SO$_4$, thus, in particular, the corresponding alkyl esters of a mineral acid, such as an alkyliodide or an alkoxy sulfate, and furthermore alkylene oxides, alkyl-lactones or acetylene.

The reduction of the nitro group of the quaternized starting compound of the general formula (5) is likewise carried out by methods which are customary per se for reduction of aromatic nitro groups by means of hydrogen on a metallic catalyst, such as a palladium, platinum or Raney nickel catalyst, under pressure in an autoclave, or by means of Bechamp reduction using iron filings, to give the compound of the general formula (3).

The starting compounds corresponding to the general formula (5) are known or can be prepared by procedures which are analogous to procedures which are customary per se, such as, for example, in accordance with the instructions in German Offenlegungsschrift No. 3,502,991.

The benzoquinones of the general formula (4) used as starting compounds are, for example, 2-methyl-3,5,6-tribromo-1,4-benzoquinone, 2-methoxy-3,5,6-trichloro-1,4-benzoquinone, 2,3,5,6-tetramethoxy-1,4-benzoquinone, 2,3,5,6-tetraphenoxy-1,4-benzoquinone, 2-methyl- 3,6-dichloro-1,4-benzoquinone, 2,5-dichloro-1,4-benzoquinone and preferably 2,3,5,6-tetrabromo-1,4-benzoquinone, and in particular 2,3,5,6-tetrachloro-1,4-benzoquinone (chloranil) and 2,3,5,6-tetrafluoro-1,4-benzoquinone.

The precipitation and isolation of the compounds of the general formula (1) prepared according to the invention from the synthesis solutions can be carried out by generally known methods, thus, for example, either by precipitation from the reaction medium by means of electrolytes, such as, for example, sodium chloride or potassium chloride, or by evaporation of the reaction solution, for example by spray-drying, it being possible for a buffer substance to be added to this reaction solution.

The compounds of the general formula (1) according to the invention—called compounds (1) below—have fiber-reactive properties and have useful dyestuff properties. They can therefore be used for dyeing (including printing) naturally occurring, regenerated or synthetic materials containing hydroxy groups and/or carboxamide groups, for example in the form of sheet-like structures, such as paper and leather, or in bulk, of polyamide or polyurethane, but in particular such materials in fiber form, such as cellulose fiber materials, silk, wool and synthetic polyamide and polyurethane fibers. The solutions obtained in the synthesis of the compounds (1) can also be put to use for dyeing directly as a liquid preparation, if appropriate after addition of a buffer substance and if appropriate also after concentration.

Depending on the use according to the invention, the compounds (1) can be applied to and fixed on the substrates mentioned, in particular the fiber materials mentioned, by the use techniques known for water-soluble, in particular fiber-reactive, dyestuffs, thus, for example, by applying the compound (1) in dissolved form to the substrate or introducing it into this and fixing it on this or in this, if appropriate by the action of heat and/or if appropriate by the action of an alkaline agent. Such dyeing and fixing methods are described in abundance in the literature, such as, for example, in European Patent Application Publication No. 0,168,751A.

The present invention therefore also relates to the use of the compounds (1) for dyeing (including printing) materials containing hydroxy and/or carboxamide groups and to processes for their use on these substrates. The materials are preferably used in the form of fiber materials, in particular in the form of textile fibers, such as yarns, wound packages and woven fabrics.

The procedures followed here can be analogous to known procedures of application and fixing of fiber-reactive dyestuffs.

The dyeings and prints produced with the compounds (1) are distinguished by pure, predominantly blue color shades. In particular, the dyeings and prints on cellulose fiber materials have very good depths of color and likewise very good fastnesses to light, including good wet and perspiration light-fastnesses, as well as good fastnesses to hypochlorite bleaching and chlorinated water, and furthermore outstanding wet-fastnesses, such as, for example, good fastnesses to washing at 40° to 60° C., fastnesses to acid and alkaline milling, cross-dyeing and perspiration and fastnesses to alkali, acid, water and sea water, and furthermore good fastness to pleating, fastness to ironing and fastness to rubbing. They also have a good fastness to lying under wet conditions and a very good stability to acid storage (no "acid fading") when damp dyed material which still contains acetic acid is stored. The dyeings are moreover stable towards the customary synthetic resin finishes. Some of the compounds (1) are comparable to fiber-reactive anthraquinone dyestuffs in the purity of their color shade and in important fastness properties.

The following Examples serve to illustrate the invention. The parts are parts by weight and the percentage data represent percentages by weight, unless indicated otherwise. Parts by weight bear the same relationship to parts by volume as the kilogram to the liter. The compounds described by way of their formulae in these Examples are given in the form of the free acids; they are in general prepared and isolated in the form of their sodium or potassium salts and used for dyeing in the form of their salts. The starting compounds and components mentioned in the form of the free acid in the following examples, in particular the Tabular Examples, can like-wise be employed in the synthesis as such or in the form of their salts, preferably alkali metal salts, such as sodium or potassium salts. The absorption maxima ($\lambda_{max}$ values) were determined in aqueous solution on the alkali metal salts. The $^1$H-NMR measurements were made in a 360 MHz apparatus in $d_6$-dimethylsulfoxide using tetramethylsilane as the internal standard, unless indicated otherwise.

EXAMPLE A a) A solution of 14.2 parts of methyl iodide in 30 parts by volume of ethanol is added in portions to a solution, at 20° C., of 33.1 parts of 3-($\beta$-hydroxyethylsulfonyl)-4-N-[$\gamma$-(N',N'-dimethylamino)-propyl]-aminonitrobenzene in 100 parts by volume of ethanol; during this addition, the reaction temperature rises to 40° C. The methylation reaction is then brought to completion by heating at the reflux temperature for 30 minutes. After the mixture has cooled, the compound prepared, of the formula

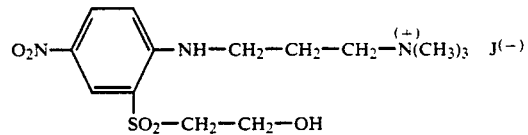

precipitates virtually quantitatively in the form of yellow crystals. It has a melting point of 218°–221° C. and shows the following data in the $^1$H-NMR spectrum: $\delta$ = 8.43 ppm (d,1H); 8.26 ppm (dd,1H); 7.32 ppm (t,1H); 7.13 ppm (d,1H); 4.90 ppm (t,1H); 3.76 ppm (q,2H); 3.56 ppm (t,2H); 3.47 ppm (m,2H); 3.42 ppm (m,2H); 3.10 ppm (s,9H); 2.05 ppm (m,2H).

b) The yellow crystals isolated from the reaction mixture of a) are ground and suspended in 300 parts of water and, after addition of 2 parts of Raney nickel, are reduced at a temperature between 25° and 60° C. under a hydrogen pressure of 10 to 20 bar. After removal of the catalyst and determination of the content, the aniline compound obtained is further processed by diazotization, preferably in solution. However, it can also be isolated in the form of its iodide salt by evaporation of the solution under reduced pressure. An oil is obtained which crystallizes completely after several hours. The crystals are suspended in 100 parts by volume of acetone, filtered off with suction and dried. They have a melting point of 165°–168° C. and show the following data in $^1$H-NMR spectroscopy:

δ=6.96 ppm (d,1H); 6,85 ppm (dd,1H); 6.72 ppm (d,1H) 5.39 ppm (t,1H); 4.85 ppm (s,br,2H); 4.78 ppm (s,br,1H); 3.64 ppm (m,2H); 3.48 ppm (m,4H); 3.12 ppm (m,2H); 3.07 ppm (s,9H); 1,98 ppm (m,2H).

EXAMPLE B

A solution of 24 parts of chloroacetic acid in 30 parts by volume of ethanol is slowly added to a solution of 83 parts of 3- (β-hydroxyethylsulfonyl)-4-N-[γ-(N',N'-dimethylamino)-propyl]-amino-nitrobenzene at a temperature of 35° to 40° C. The reaction is brought to completion at the reflux temperature over about 4 hours. The yellow reaction product which has precipitated is filtered off with suction, washed with a little acetone and dried under reduced pressure.

The resulting 3-(β-hydroxyethylsulfonyl)-4-N-[γ-(N',N'-dimethyl-N'-carboxymethyl-ammonium)-propyl]-amino-nitrobenzene has a melting point of 179°-182° C. and shows the following $^1$H-NMR data:

δ=8.41 ppm (d,1H); 8.25 ppm (dd,1H); 7.31 ppm (m,1H); 7.08 ppm (d,1H); 4.97 ppm (s,br,1H); 3.74 ppm (m,2H); 3.56 ppm (m,2H); 3.48 ppm (m,2H); 3.12 ppm (s,2H); 3.07 ppm (m,2H); 2.71 ppm (s,6H); 1.98 ppm (m,2H).

The nitro compound is dissolved in 500 parts by volume of water and, after addition of 5 parts of Raney nickel, is reduced by means of hydrogen under a pressure of 10 to 20 bar at a temperature between 25° and 60° C. After removal of the catalyst, the resulting aniline solution can be further processed under a nitrogen atmosphere (see, for example, the following Example 2), or can also be isolated in accordance with the instructions of Example A.

EXAMPLE C 24.4 parts of 2-chloroethanol are slowly added to a solution of 132.4 parts of 3- (β-hydroxyethylsulfonyl)-N-[γ-(N',N'-dimethylamino)-propyl]-amino-nitrobenzene in 400 parts by volume of ethanol at a temperature of 35° to 40° C. The reaction is then carried out under reflux temperature over about 16 hours. The mixture is subsequently cooled to 10° C.; the yellow reaction product which has precipitated is filtered off with suction, washed with a little ethanol and dried under reduced pressure. The compound of the formula

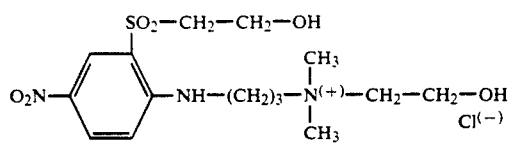

is obtained in the form of yellow crystals of melting point 88°-92° C. It shows the following $^1$H-NMR data:

δ=8.42 ppm (d,1H); 8.26 ppm (dd,1H); 7.31 ppm (t,1H); 7.12 ppm (d,1H); 5.53 ppm (t,1H); 5.13 ppm (t,1H); 3.76 ppm (m,2H); 3.57 ppm (m,2H); 3.46 ppm (m,4H); 3.12 ppm (s,6H); 2.08 ppm (m,2H).

90.6 parts of this nitro compound are dissolved in 300 parts by volume of water and, after addition of 12 parts of Raney nickel, are reduced by means of hydrogen and a hydrogen pressure of 10 to 20 bar at a temperature of 25° to 60° C. After removal of the catalyst, the resulting solution of the aniline compound can be further processed under a nitrogen atmosphere, for example in accordance with the instructions of the following Example 3. However, the aniline compound can also be isolated in accordance with the instructions of Example A.

EXAMPLE 1 a) To prepare a triphendioxazine compound according to the invention, the aniline compound described under Example Ab) is used as the starting substance, the solution of the aniline compound obtained from the reduction advantageously being employed in the reaction with chloranil after removal of the Raney nickel. 11.1 parts of chloranil are thus added under a nitrogen atmosphere to the aqueous aniline solution, obtained as the filtrate, at 50° C. in the course of 30 minutes, a pH of 6 being maintained by means of about 5.5 parts of sodium carbonate. The mixture is subsequently stirred at 60° C. and a pH of 6 for a further 2 hours and is then cooled to 20° C., and a pH of 3.7 to 4.0 is established by means of aqueous hydrochloric acid. The brown condensation product which has precipitated is filtered off with suction and dried under reduced pressure at 60° C. It has the following $^1$H-NMR data:

δ=9.58 ppm (s,2H,NH); 7.35 ppm (m,4H); 6.92 ppm (d,2H); 6.26 ppm (t,2H,NH); 5.00 ppm (t,2H,O-H); 3.7 ppm (m,4H); 3.42 ppm (m,8H); 3.29 ppm (m,4H); 3.10 ppm (s,18H); 2.02 ppm (m,4H).

b) 40 parts of the condensation product obtained under a) are introduced into a mixture, warmed to 20° C., of 125 parts by volume of 20% strength oleum and 130 parts by volume of sulfuric acid monohydrate in the course of 30 minutes. The mixture is subsequently stirred at 25° C. for about 2½ hours. 22.8 parts of ammonium peroxydisulfate are then added at a temperature between 22° and 24° C. in the course of 30 minutes and the mixture is subsequently stirred at 20° C. for a further 90 minutes and then poured slowly onto 900 parts of ice. After about 1 hour, the triphendioxazine compound according to the invention which has precipitated is filtered off and suspended in 200 parts of water. The suspension is brought to a pH of 6 by means of sodium bicarbonate and the product is filtered off again and dried under reduced pressure at 50° C.

The alkali metal salt (sodium salt) according to the invention of the compound of the formula

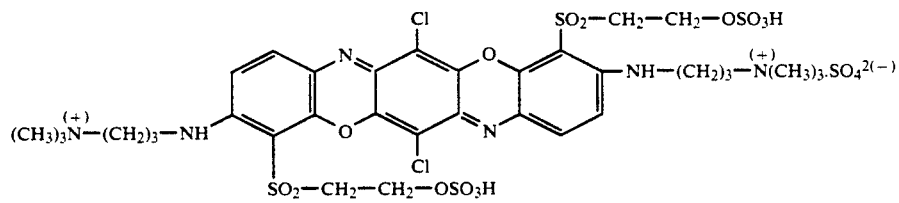

is obtained as a powder containing electrolyte salt, predominantly sodium sulfate (the particular β-sulfatoethylsulfonyl group can also be bonded in the other ortho-position relative to the amino group, but with greater probability is in the position shown in the above formula).

This compound according to the invention has very good fiber-reactive dyestuff properties ($\lambda_{max}=572$ nm). It dyes the materials mentioned in the description, in particular cellulose fiber materials, such as cotton, by the procedures known and customary in the art for application and fixing of fiber-reactive dyestuffs in deep, reddish-tinged blue shades having good fastness properties, such as, in particular, good fastness to light of the dry or damp dyeings, such as dyeings moistened with drinking water, and good light-fastness to alkaline perspiration, fastness to chlorinated water, fastness to hypochlorite, fastness to alkaline perspiration, fastness to lying under wet conditions and stability under acid storage.

EXAMPLE 2 a) About 500 parts by volume of an aqueous solution of the aniline compound of the formula

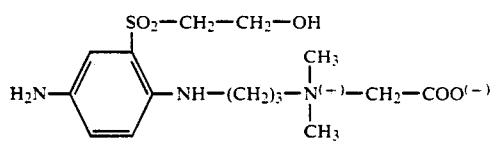

(see Example B) containing 0.224 mol (respectively 80.45 parts) of this aniline compound are heated to 50° C., and 28.2 parts of 2,3,5,6-tetrachloro-1,4-benzoquinone are added in the course of 30 minutes, a pH of 6 being maintained. The reaction mixture is kept at 65° C. for a further 2 hours, while stirring, and is then cooled to 20° C., and a pH of 3.7 to 4.0 is established by means of hydrochloric acid. The brown condensation product which has precipitated is dried under reduced pressure. It shows the following $^1$H-NMR data:

$\delta=9.60$ ppm (s,1H); 7.38 ppm (d,1H); 7.34 ppm (dd,1H); 6.92 ppm (d,1H); 6.26 ppm (m,1H); 5.00 ppm (s,br,1H); 3.69 ppm (m,2H); 3.45 ppm (m,2H); 3.35 ppm (m,2H); 3.17 ppm (s,2H); 3.12 ppm (m,2H); 2.73 ppm (s,6H); 2.00 ppm (m,2H).

b) 71.1 parts of the condensation product obtained under a) are introduced into a mixture of 200 parts by volume of 20% strength oleum and 208 parts by volume of sulfuric acid monohydrate at 25° C. 38.1 parts of sodium peroxidisulfate are added and the temperature is kept at 22° to 25° C. for about 3 hours. The mixture is then poured onto 1500 parts of ice. The triphendioxazine compound according to the invention which has precipitated is filtered off with suction, the acid residue is suspended in 500 parts by volume of water and the suspension is brought to a pH of 5.8 with about 28 parts of lithium carbonate. The resulting alkali metal salt (lithium salt) of the compound according to the invention, of the formula

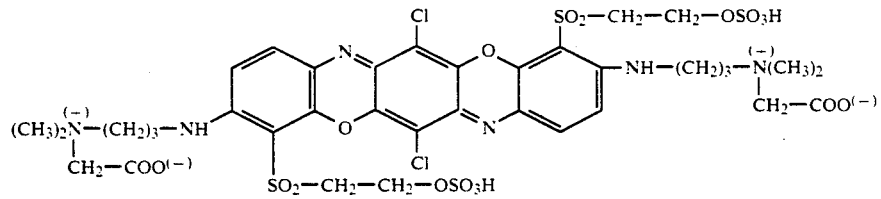

is isolated by filtration and dried under reduced pressure. It has only a low electrolyte salt content.

This compound according to the invention has very good fiber-reactive dyestuff properties ($\lambda_{max}=567$ nm). It dyes the materials mentioned in the description, in particular cellulose fiber materials, such as cotton, by the procedures customary and known in the art for application and fixing of fiber-reactive dyestuffs in deep reddish-tinged blue shades having good fastness properties, such as, in particular, good light-fastness of the dry or damp dyeings, such as dyeings moistened with drinking water, and good light-fastness to alkaline perspiration, fastness to chlorinated water, fastness to hypochlorite, fastness to alkaline perspiration, fastness to lying under wet conditions and stability under acid storage.

EXAMPLE 3

25 parts of 2,3,5,6-tetrachloro-1,4-benzoquinone are added to about 300 parts by volume of an aqueous solution of 3- ($\beta$-hydroxyethylsulfonyl)-4-N-[$\gamma$-(N',N'-dimethyl-N'-$\beta$'-hydroxyethylammonium)-propyl]-aminoaniline hydrochloride containing 0.205 mol(respectively 64.6 parts) of this aniline compound. The condensation reaction is carried out at 60° C. and a pH of 6. The mixture is then cooled to 20° C., a pH of 3.6 is established by means of hydrochloric acid and the brown condensation product which has precipitated is filtered off with suction.

67.5 parts of the condensation product are dissolved in a mixture of 200 parts by volume of 20% strength oleum and 208 parts by volume of sulfuric acid monohydrate at 25° C. 36.5 parts of ammonium peroxidisulfate are slowly added, while maintaining a temperature of 20° to 25° C., and the reaction mixture is subsequently stirred at this temperature for about a further 12 hours. It is then poured onto 1500 parts of ice and the triphendioxazine compound according to the invention which has precipitated is filtered off with suction. The residue is suspended in 300 parts of water and dissolved at a pH of 4.2 to 4.5 by means of about 24 parts of sodium carbonate. After customary clarification of the solution, it is evaporated at 60° C. under reduced pressure or spray dried.

The alkali metal salt (sodium salt) according to the invention of the compound of the formula

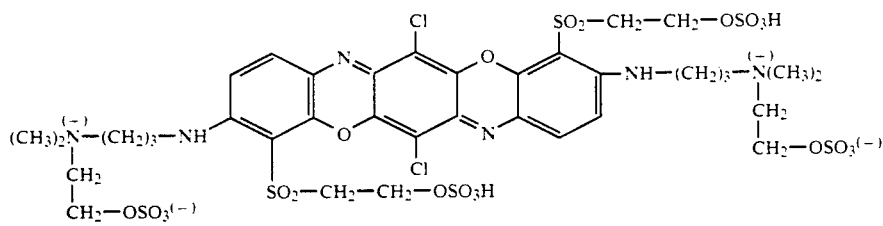

is obtained as a powder containing electrolyte salt, predominantly sodium sulfate (the particular β-sulfatoethylsulfonyl group can also be bonded in the other ortho-position relative to the amino group, but with greater probability is in the position shown in the above formula).

This compound according to the invention has very good fiber-reactive dyestuff properties ($\lambda_{max}$=574 nm). It dyes the materials mentioned in the description, in the procedures customary and known in the art for application and fixing of fiber-reactive dyestuffs in deep reddish-tinged blue shades having good fastness properties, such as, in particular, good light-fastness of the dry or damp dyeings, such as dyeings moistened with drinking water, and good light-fastness to alkaline perspiration, fastness to chlorinated water, fastness to hypochlorite, fastness to alkaline perspiration, fastness to lying under wet conditions and stability under acid storage.

EXAMPLES 4 TO 39

Other triphendioxazine compounds according to the invention are described with the aid of the formula members of the general formula (A)

in which W represents the radical of W* written in "mirror image form" in the table, in the following Tabular Examples. The compounds according to the invention can be prepared in the manner according to the invention, thus, for example, analogously to the above exemplary Embodiment Examples, from the corresponding aniline compound which can be seen from the particular tabular example and corresponds to the general formula (3a)

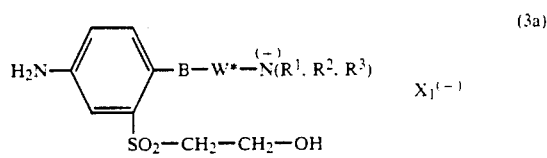

and the benzoquinone compound shown in the particular Tabular Example. They likewise have very good fiber-reactive dyestuff properties and produce deep dyeings and prints, in particular on cellulose fiber materials, having good fastness properties in the color shade shown in the particular Tabular Example.

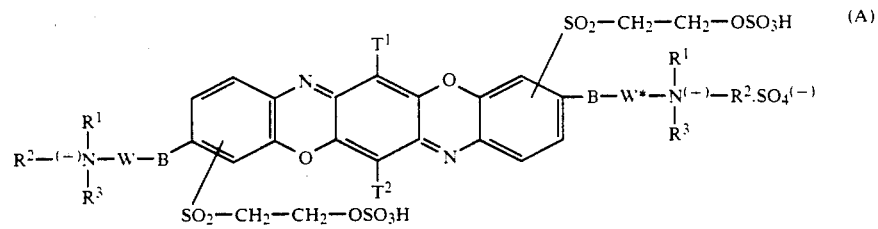

| Example | Compound of the formula (1) Radical —B— | (+) Radical —W*—N($R^1$, $R^2$, $R^3$) | $T^1 = T^2$ | Starting benzoquinone | Color shade |
| --- | --- | --- | --- | --- | --- |
| 4 | —NH— | γ-[N,N-Dimethyl-N-(ω'-hydroxypentyl)-ammonium]-propyl | Chlorine | Chloranil | Reddish-tinged blue |
| 5 | —NH— | γ-[N,N-Dimethyl-N-ethyl-ammonium]-propyl | Chlorine | " | " |
| 6 | —NH— | γ-(Trimethylammonium)-propyl | Chlorine | " | " |
| 7 | —NH— | γ-[N,N-Dimethyl-N-n-butyl-ammonium]-propyl | Chlorine | " | " |
| 8 | —NH— | γ-[N,N-Dimethyl-N-(β'-acetyloxyethyl)-ammonium]-propyl | Chlorine | " | " |
| 9 | —NH— | γ-[N,N-Dimethyl-N-(β'-carbethoxymethyl)-ammonium]-propyl | Chlorine | " | " |
| 10 | —NH— | γ-[N,N-Dimethyl-N-β'-benzyl-ammonium]-propyl | Chlorine | " | " |
| 11 | —NH— | γ-[N,N-Dimethyl-N-β'-phenyl-ammonium]-propyl | Chlorine | " | " |
| 12 | —NH— | γ-[N,N-Dimethyl-N-(β'-carboxyethyl)-ammonium]-propyl | Chlorine | " | " |
| 13 | —NH— | γ-[N,N-Dimethyl-N-ethyl-ammonium]-propyl | Chlorine | " | " |
| 14 | —NH— | γ-[N,N-Dimethyl-N-(γ'-hydroxypropyl)-ammonium]-propyl | Chlorine | " | " |
| 15 | —NH— | γ-[N,N-Dimethyl-N-(δ'-hydroxy- | Chlorine | " | " |

-continued

| Example | Compound of the formula (1) Radical —B— | Compound of the formula (1) Radical —W⁺—N(R¹, R², R³) (+) | T¹ = T² | Starting benzoquinone | Color shade |
|---|---|---|---|---|---|
| 16 | —NH— | γ-[N,N-Dimethyl-N-(ω'-hydroxy-hexyl)-ammonium-N-(ω'-hydroxy-butyl)-ammonium]-propyl | Chlorine | Chloranil | Reddish-tinged blue |
| 17 | —NH— | β-(Trimethylammonium)-ethyl | Chlorine | " | " |
| 18 | —N(CH₃)— | β-(Trimethylammonium)-ethyl | Chlorine | " | " |
| 19 | —O— | β-[N,N-Dimethyl-N-carboxymethyl-ammonium]-ethyl | Chlorine | " | Bluish-tinged red |
| 20 | 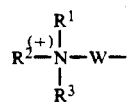 | | Chlorine | " | Reddish-tinged blue |
| 21 | —N(CH₃)— | β-(N-Methyl-benzopyrrolidinium)-ethyl | Chlorine | " | " |
| 22 | —NH— | β-{β'-[N,N-Dimethyl-N-(β"-hydroxy-ethyl)-ammonium]-ethylthio}-ethyl | Chlorine | " | " |
| 23 | —NH— | β-{β'-[(N,N-Dimethyl-N-carboxymethyl)-ammonium-ethoxy]-ethyl | Chlorine | " | " |
| 24 | —NH— | γ-[N,N-Diethyl-N-methyl-ammonium]-propyl | Chlorine | " | " |
| 25 | —NH— | γ-[N,N-Diethyl-N-carboxymethyl-ammonium]-propyl | Chlorine | " | " |
| 26 | —NH— | γ-[N,N-Diethyl-N-(β'-hydroxy-ethyl)-ammonium]-propyl | Chlorine | " | " |
| 27 | —NH— | γ-[N,N-Dimethyl-N-(β'-hydroxy-ethyl)-ammonium]-β,β-dimethyl-propyl | Chlorine | " | Reddish-tinged blue |
| 28 | —NH— | γ-[N,N-Dimethyl-N-carboxymethyl-ammonium]-β,β-dimethyl-propyl | Chlorine | " | " |
| 29 | —NH— | γ-[β'-(N,N-Dimethyl-N-carboxymethyl-ammonium)-ethylsulfonyl]-propyl | Chlorine | " | " |
| 30 | N,N-Bis-{β-[β'-(N,N-dimethyl-N-β-hydroxyethyl-ammonium)-ethylsulfonyl]-ethyl}-amino | | Chlorine | " | " |
| 31 | —NH— | γ-[N,N-Dimethyl-N-carboxymethyl-ammonium]-propyl | Methyl | 2,5-Dichloro-3,6-dimethyl-1,4-benzoquinone | " |
| 32 | —NH— | γ-[N,N-Dimethyl-N-carboxymethyl-ammonium]-propyl | Methoxy | 2,5-Dichloro-3,6-dimethoxy-1,4-benzoquinone | " |
| 33 | —NH— | γ-[N,N-Dimethyl-N-carboxymethyl-ammonium]-propyl | Acetylamino | 2,5-Dichloro-3,6-acetylamino-1,4-benzoquinone | " |
| 34 | —NH— | γ-[N,N-Dimethyl-N-carboxymethyl-ammonium]-propyl | Phenoxy | 2,3,5,6-Tetra-phenoxy-1,4-benzoquinone | " |
| 35 | —NH— | γ-[N,N-Diethyl-N-(β-hydroxy-ethyl)-ammonium]-propyl | Methyl | 2,5-Dimethyl-1,4-benzoquinone | " |
| 36 | —NH— | γ-[N,N-Diethyl-N-(β-hydroxy-ethyl)-ammonium]-propyl | Hydrogen | 1,4-Benzoquinone | " |
| 37 | —NH— | γ-[N,N-Diethyl-N-(β-hydroxy-ethyl)-ammonium]-propyl | Carbamoyl | 2,5-Dibromo-3,6-di-carboxamido-1,4-benzoquinone | Reddish-tinged blue |
| 38 | —NH— | γ-[N,N-Diethyl-N-(β-hydroxy-ethyl)-ammonium]-propyl | Fluorine | 2,3,5,6-Tetrafluoro-1,4-benzoquinone | " |
| 39 | —NH— | γ-[N,N-Diethyl-N-(β-hydroxy-ethyl)-ammonium]-propyl | Bromine | 2,3,5,6-Tetrabromo-1,4-benzoquinone | " |

We claim:

1. A water soluble, fiber-reactive triphendioxazine compound having quaternary ammonium groups, of the formula

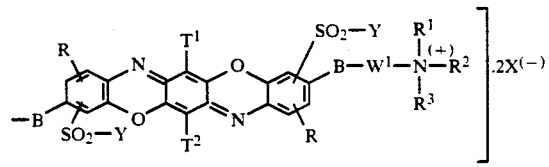

(1)

in which:

B is oxygen or sulfur or an amino group of the formula —NH— or —N(R')—, in which R' is alkyl of 1 to 4 carbon atoms which can be substituted by sulfo, sulfato, phosphato, or carboxy or lower alkoxy or alkanoylamino of 2 to 4 carbon atoms or phenyl or sulfophenyl, or has one of the meanings of the group $X^{(-)}[R^3,R^2,R^1]N^{(+)}-W-$ or $-W^1-{(+)}N[R^1,R^2,R^3]X^{(-)}$, where W, $W^1$, $R^1$, $R^2$, $R^3$ and $X^{(-)}$ have the definition given below, or, together with $R^1$, forms an alkylene having 2 to 4 carbon atoms;

$R^1$ is a straight-chain or branched alkyl group having 1 to 6 carbon atoms which is unsubstituted or substituted by 1 to 2 substituents which are selected from the group consisting of carboxy, sulfo, sulfato, phosphato, alkoxy having 1 to 4 carbon atoms, alkanoyloxy having 2 to 5 carbon atoms, phenyl and phenyl which is substituted by 1 or 2 sulfo groups;

$R^2$ has one of the meanings of $R^1$ and $R^3$ has one of the meanings of $R^1$ or $R^2$ and $R^3$, together with the positively charged nitrogen atom, form the trimethylene-iminium, pyrrolidinium, morpholinium, piperidinium or piperazinium or benzopyrrolidinium radical $X^{(-)}$ is the molar equivalent of a colorless anion, but in the case where one of the substituents of $R^1$, $R^2$ and $R^3$ contains an acid group which is capable of forming an inner salt with the ammonium nitrogen, so that in this case $X^{(-)}$ is without any meaning;

W is an alkylene group having 2 to 6 carbon atoms, unsubstituted or substituted by 1 or 2 substituents selected from the group consisting of sulfato, phosphato, carboxy, sulfo, phenyl, monosulfophenyl or disulfophenyl, or is an alkylene group having 4 to 12 carbon atoms, interrupted by at least 1 hetero group selected from the group consisting of $-O-$, $-S-$, $-SO_2-$, $-CO-$, 1,4-piperidino, $-NH-$ and $-N(R^0)-$, in which $R^0$ is alkyl of 1 to 6 carbon atoms unsubstituted or substituted by substituents selected from the group consisting of sulfo, sulfato, carboxy, phosphato, phenyl, monosulfophenyl or disulfophenyl, or is alkanoyl having 2 to 5 carbon atoms, and the alkylene moieties of W are unsubstituted or substituted by 1 or 2 substituents selected from the group consisting of sulfato, phosphato, carboxy, sulfo, phenyl, monosulfophenyl and disulfophenyl;

$W^1$ has one of the meanings of W;

Y is the vinyl group, or an ethyl group which contains in the β-position a substituent which can be eliminated by an alkali;

R is a hydrogen atom or a sulfo group;

$T^1$ is a hydrogen atom or a halogen atom, a cycloalkyl group having 5 to 8 carbon atoms, phenylalkoxy, an alkoxy group having 1 to 4 carbon atoms, phenoxy, an alkyl group having 1 to 4 carbon atoms, phenyl, a cyano group, a carboxy group, a carbalkoxy group having 2 to 5 carbon atoms, a carbamoyl group, an N-alkylcarbamoyl group with an alkyl radical of 1 to 4 carbon atoms or an N,N-dialkylcarbamoyl group with alkyl radicals having in each case 1 to 4 carbon atoms, N-phenyl-carbamoyl, an alkanoylamino group having 2 to 5 carbon atoms, or benzoylamino, the benzene moieties in the above-mentioned substituents being unsubstituted or substituted by 1 or 2 substituents from the group consisting of halogen, nitro, alkyl having 1 to 4 carbon atoms, alkoxy having 1 to 4 carbon atoms, carboxy and sulfo;

$T^2$ has one of the meanings given for $T^1$; and the individual members of the formula, including those which appear twice, can have meanings which are identical to one another or different from one another.

2. The compound of claim 1, wherein said $SO_2-Y$ group is bonded to the benzene nucleus in the orthoposition relative to the radical B.

3. The compound of claim 1, wherein $T^1$ or $T^2$, or both denote a chlorine or bromine atom.

4. A compound as claimed in claim 1, in which $T^1$ or $T^2$ or both each denote a hydrogen atom, an alkanoylamino group having 2 to 5 carbon atoms, a phenoxy group, which can be unsubstituted or substituted by 1 or 2 substituents selected from the group consisting of halogen, nitro, alkyl having 1 to 4 carbon atoms, alkoxy having 1 to 4 carbon atoms, carboxy and sulfo, an alkoxy group having 1 to 4 carbon atoms or an alkyl group having 1 to 4 carbon atoms.

5. A compound as claimed in claim 1, in which $R^1$, $R^2$ and $R^3$ are each identical to one another or different from one another and are an alkyl having 1 to 4 carbon atoms, which can be substituted by 1 or 2 substituents from the group comprising carboxy, sulfo, sulfato, phosphato, alkoxy having 1 to 4 carbon atoms, alkanoyloxy having 2 to 5 carbon atoms, phenyl and phenyl which is substituted by 1 or 2 sulfo groups.

6. A compound as claimed in claim 1, wherein $R^1$, $R^2$ and $R^3$ are each identical to one another or different from one another and denote methyl, ethyl, 1-propyl, 2-propyl, 1-butyl, 3- or 4-sulfobenzyl, β-sulfatoethyl, β-phosphato-ethyl, carboxymethyl, β-sulfoethyl, ω-sulfato-hexyl, δ-sulfato-propyl, γ-sulfato-propyl, β-carboxy-ethyl or β-acetyloxy-ethyl.

7. A compound as claimed in claim 1, in which 2 $X^{(-)}$ together denote the sulfate ion.

8. A compound as claimes in claim 1, in which B represents the amino group $-NH-$.

9. A compound as claimed in claim 1, in which Y denotes β-sulfatoethyl.

10. A compound as claimed in claim 1, in which R denotes hydrogen.

11. A compound as claimed in claim 1, in which $T^1$ and $T^2$ both represent a chlorine atom.

12. A compound as claimed in claim 1, in which W and $W^1$ are identical to one another or different from one another and each denotes an alkylene having 2 to 6 carbon atoms, unsubstituted or substituted by 1 or 2 substituents from the group comprising sulfato, phosphato, carboxy, sulfo, phenyl, monosulfophenyl and disulfophenyl, or is an alkylene having 4 to 12 carbon atoms, which is interrupted by 1 to 5 hetero groups selected from the groups $-O-$, $-S-$, $-SO_2-$, $-CO-$, 1,4-piperidino, $-NH-$ and $-N(R^0)-$, in which $R^0$ is an alkyl having 1 to 6 carbon atoms which can be substituted by a sulfo, sulfato, carboxy, phosphato, phenyl, monosulfophenyl or disulfophenyl group, or denotes an alkanoyl group having 2 to 5 carbon atoms.

13. A compound as claimed in claim 1, in which $W^1$ is the 1,2-ethylene, 1,3-propylene or 2-sulfato-1,3-propylene radical or a radical of the formula (a), (b), (d), ($j_1$) or ($k_1$)

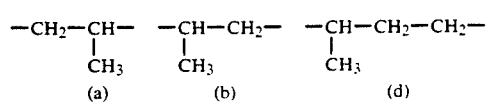

-continued

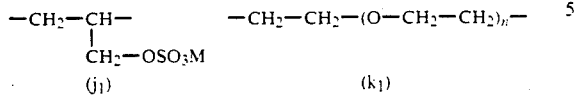

(j₁)   (k₁)

in which M is a hydrogen atom or an alkali metal and n represents a number from 1 to 5.

14. A compound as claimed in claim 1, in which W is 1,2-ethylene, 1,3-propylene or 2-sulfato-1,3-propylene or a radical of the formula (a), (b), (e), (j₂) or (k₂)

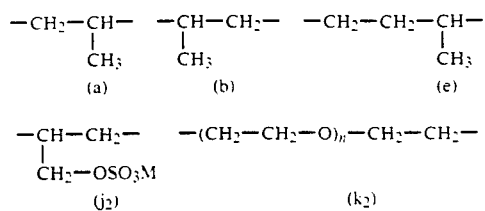

in which M is a hydrogen atom or an alkali metal and n represents a number from 1 to 5.

15. A compound as claimed in claim 1, in which $R^1$ and $R^2$ both represent methyl or ethyl and $R^3$ is methyl, carboxymethyl, β-sulfatoethyl or β-sulfoethyl, or an n-propyl group which is substituted by a sulfato.

* * * * *